Patented July 8, 1952

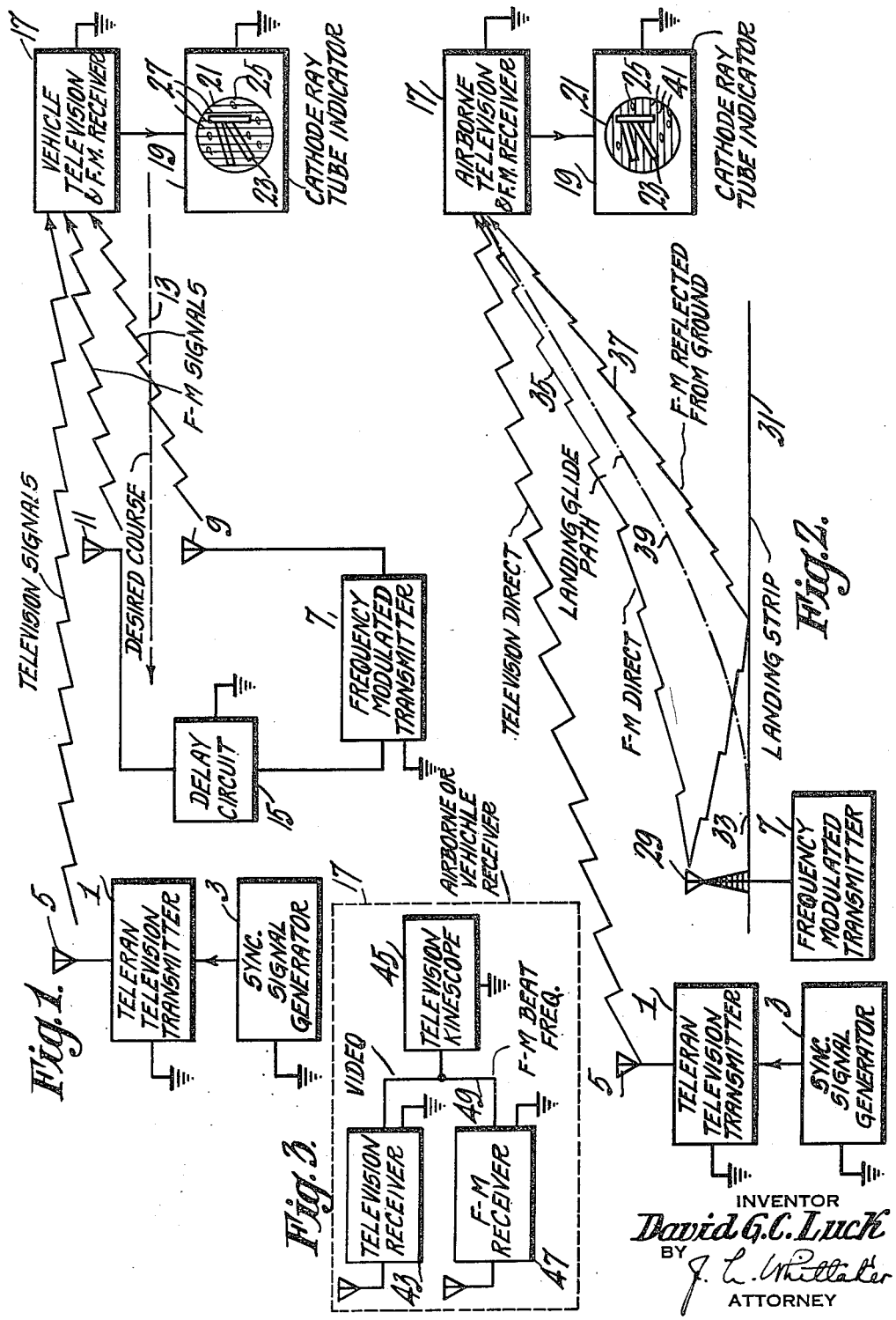

2,602,925

UNITED STATES PATENT OFFICE 2,602,925

RADIO NAVIGATION SYSTEM

David G. C. Luck, Princeton, N. J., assignor to Radio Corporation of America, a corporation of Delaware Application April 20, 1950, Serial No. 156,977

14 Claims. (Cl. 343—112)

This invention relates generally to improvements in pictorial display radio navigation systems for providing additional course or bearing navigational information. More particularly, the invention relates to improvements in a television or pictorial display radio navigation system for indicating departure of an aircraft or other vehicle from a predetermined course or path. The system according to the invention requires very simple beacon and vehicle-carried apparatus in addition to the conventional pictorial display system.

A principal object of the invention is to provide improved methods of and means for adding to a pictorial display radio navigational system provision for radiating from a radio beacon and receiving on a moving vehicle, information with respect to the course and bearing of said vehicle with respect to said beacon.

Another object of the invention is to provide an improved radio navigational system depending upon phase or frequency variations of signals received at a moving vehicle or aircraft from a radio beacon system to provide course and bearing information.

A further object of the invention is to provide an improved radio beacon system utilizing a plurality of frequency-modulated signals radiated with predetermined relative time delay.

A still further object is to provide an improved radio landing system for aircraft utilizing a plurality of received frequency modulated signals, the relative phase or frequency therebetween defining a predetermined navigational course or landing path.

Another object of the invention is to provide a radio navigational system combining in a common pictorial display, television navigational information signals with frequency modulated beacon signals having predetermined relative time delay.

A still further object of the invention is to provide a radio navigational system and method utilizing a television type pictorial display in combination with frequency modulated beacon signals radiated at predetermined relative time delays wherein the beat frequency between said received frequency modulated signals is in predetermined harmonic relation with a frequency component of said pictorial display television signals.

Another object of the invention is to provide a radio navigational system requiring the addition to a pictorial display navigational system of a minimum of very simple apparatus components.

It is known that, in a television transmission system, the addition to the video signals of a single frequency signal at a harmonic of the line repetition frequency will produce vertical light and dark bars in the received television display. If the added signal differs slightly from the line repetition harmonic frequency, the bars will drift horizontally across the picture. Similarly, a signal at a harmonic of the frame repetition frequency will produce horizontal light and dark bars on the pictorial display. Slight departure from harmonicity will cause the horizontal bars to drift vertically across the television display.

It is also well known that if a frequency modulated signal traverses two different propagation paths, and the signals received at the ends of these paths are mixed, a beat note will be produced of frequency depending on the rate of change of signal frequency during modulation, and on the difference in the electrical length of the two propagation paths. It is the purpose of the instant invention to combine the foregoing known effects to provide a simple and efficient radio navigational system.

Briefly, a bearing or course radio beacon system may be provided as an adjunct to a conventional television or pictorial display navigational system by radiating frequency modulated signals from points equidistant from opposite sides of a desired airport runway or navigational course. The radiating antenna may be energized from a single frequency modulated radio transmitter with such relative time delay that the signals received anywhere in the vertical plane through said course will produce a beat frequency. The beat frequency may be equal, for example, to some harmonic of the line repetition frequency of the television navigational display signals. By mixing the beat note output of an airborne frequency modulation receiver with the video signals in the airborne television receiver, vertical bars will be produced in the received navigational display. If the vehicle or aircraft is centered on the plane of the desired navigational course, the vertical bars in the pictorial display will be stationary. However, if the vehicle moves to the right of its intended course, the received beat frequency signals will change as a result of the differential change in propagation path lengths, and the vertical bars in the pictorial display will then drift leftwardly across the display at a speed proportional to the error in position of the vehicle. The drift will continue as long as the position error exists.

The same general principles may be applied to an aircraft glide path landing system. An elevated signal radiator fed from a frequency modulated transmitter will produce a beat frequency at a remote point which is proportional in frequency to the difference in length between direct and earth-reflected signal propagation paths. The frequency modulation can be so chosen that the beat frequency at the airborne antenna, mounted high on the aircraft, will be precisely an integral harmonic of the television frame repetition frequency when the aircraft wheels just touch the runway. Under these conditions, stationary horizontal bars will be provided in the airborne television display when the aircraft flies along a hyperbolic glide path in the desired vertical plane which will just bring the aircraft wheels tangent to the runway at the desired contact point. If the aircraft flies too high, the bars will drift downwardly across the television display at a rate proportional to the vertical positional error.

Thus, by combining a television pictorial display navigational system with the course defining and glide path defining beacon systems described heretofore, and by including in an airborne installation a frequency modulation radio receiver in addition to the television receiver, complete navigational data and radio landing information can be provided in a single pictorial display. The display may also include information relative to the position of other airborne vehicles in its immediate vicinity. The details of conventional television pictorial display navigational systems are described, for example, in an article entitled "The Teleran Proposal" in Electronics for February 1946 at pages 124 to 127 inclusive.

A more detailed explanation of the details of the foregoing radio navigational systems will follow by reference to the accompanying drawing in which:

Figure 1 is a schematic block circuit diagram of a radio beacon system in accordance with the invention.

Figure 2 is a schematic block circuit diagram of a glide path radio landing system in accordance with the invention.

Figure 3 is a block schematic circuit diagram of an airborne or vehicle receiver adapted to the systems of Figs. 1 and 2.

Similar reference characters are applied to similar elements throughout the drawing.

Referring to Figure 1 of the drawing, a ground based radio navigational system according to the invention includes a Teleran television transmitter in combination with a frequency modulation transmitter which radiates frequency modulated signals from opposite sides of a desired course. The television transmitter 1 includes a synchronizing signal generator 3 and radiates from a television antenna 5 television signals characteristic of a pictorial radar display of, for example, the Plan Position Indicator (PPI) type. The details of such combined PPI radar and television navigational systems are described in the aforementioned publication and are further described in the copending application of Loren F. Jones, Serial No. 731,451, filed February 28, 1947, Patent No. 2,513,490, issued July 14, 1950.

The frequency modulated signals for providing the desired course navigational signals are derived from a frequency modulation transmitter 7 and radiated from a pair of frequency modulation signal antennas 9, 11 disposed equidistantly from opposite sides of a desired navigational course 13. A delay circuit 15 is interposed between the frequency modulation transmitter 7 and the antenna 11 to provide a predetermined delay between the radiated frequency modulated signals. The amount of time delay is selected to provide, at points in space in a vertical plane through the desired course 13, a beat frequency between the radiated frequency modulated frequency signals equal, for example, to a desired harmonic of the line repetition frequency of the television signals radiated from the television antenna 5.

In the remote or airborne vehicle, there is included a conventional television receiver for the reception of the television navigational display signals and there is also included a frequency modulation signal receiver responsive to the relatively delayed frequency modulation beacon signals. The combined television and frequency modulation receiver 17 includes a cathode ray tube indicator 19 of the conventional kinescope type.

As explained heretofore, the television display on said tube 19 will include a pictorial display 21 including a predetermined representation 23 of the desired navigational course or aircraft runway as well as characteristic indicia 25 of other vehicles or aircraft in the immediate vicinity. Also, the display 21 will include vertical light and dark bars 27 produced by the combination of the received television line repetition frequency signals and the beat frequency between the received frequency modulated signals. If the vehicle or aircraft is "on-course," the vertical bars will remain stationary on the pictorial display. If the vehicle or aircraft is "off-course" the vertical bars will move to the right or to the left at a rate dependent upon the degree "off-course." Thus, the system described may be employed as a beacon system for navigating aircraft to a predetermined position or landing strip or may be employed by other vehicles such as ships for following a desired course.

The system of Figure 2 is similar in many respects to that described heretofore by reference to Figure 1, but is directed to a glide path landing system by which aircraft may be landed along a predetermined glide path to a predetermined touchdown spot on a runway. The azimuth information would necessarily be supplied by other means such as the system described in Figure 1. In Figure 2 the airborne equipment is the same as described heretofore in Figure 1 and the ground Teleran television-radar transmitter and synchronizing signal generator are the same as in Figure 1.

The frequency modulated transmitter 7 is connected to a frequency modulation signal antenna 29 located approximately in line with the landing strip 31 well beyond the desired touchdown point 33. Signals radiated from the FM antenna 29 travel a direct path 35 and are also reflected from the ground on a path 37 so that they arrive at the airborne receiver at different times, the reflected signal arriving later than the direct signal. The frequency modulation should be so chosen that the received beat frequency at the airborne receiver, which should have a frequency modulation antenna mounted high on the plane, will be an integral harmonic of the television frame repetition frequency when the plane is following the desired glide path 39 and when the wheels of the plane touch the landing strip 31 at the touchdown point 33. Under such conditions, horizontal bars 41 in the airborne pictorial display 21 will appear stationary. If the plane is above or below the desired landing glide path, the horizontal bars 39 will move downwardly or upwardly respectively on the pictorial display.

It should be understood that for a complete navigation and landing system, the systems of Figures 1 and 2 preferably should be combined. It will be seen that while this requires ground frequency modulation transmitter and antenna components for determining both the desired course and the desired landing glide path, the same airborne equipment will respond to both types of navigation signals and will provide a composite display. For navigating vehicles at ground or sea level, the system of Fig. 2 would not be necessary.

Figure 3 indicates in greater detail the character of the vehicle-borne receiver 17. The receiver includes a television receiver 43 providing video and synchronizing signals to a conventional kinescope 45. The receiver also includes a frequency modulation signal receiver 47 which is responsive to the relatively delayed frequency modulation signals from the beacon antenna. The FM receiver 47 thus provides a beat frequency signal on the output line 49 which is a predetermined harmonic of either the line repetition frequency or the frame repetition frequency of the television synchronizing signals, as desired. The beat frequency on the line 49 is combined with video signals applied to the television kinescope 45 and thus produces the horizontal or vertical light or dark bars, or both, described heretofore in the systems of Figures 1 and 2. It should be understood that the output beat frequency from the FM receiver need not necessarily be related to the line or frame frequencies of the picture providing that it is suitably related to some other regularly recurrent picture signal component which will provide a suitable pictorial display of the azimuth or glide-path information.

Thus the invention described comprises improved radio navigational systems dependent upon the beat frequency between relatively delayed frequency modulated beacon signals as received at a vehicle, said beat frequency signals being related to a picture signal component on a vehicle-borne pictorial television display. The systems described have the advantage over prior known systems in that phase of frequency characteristics of beacon signals are employed for navigational purposes whereby the system is substantially independent of and insensitive to signal amplitude variations.

What I claim is:
1. A radio avigation system including means for radiating to an aircraft signals providing a pictorial navigational display and including predetermined frequency components, a source of frequency-modulated signals, means for differentially radiating said frequency-modulated signals with predetermined time delay so that the detectable beat frequency at points in space along a predetermined course is in predetermined harmonic relation with a frequency component of said display signals, receiving means at said aircraft for providing said pictorial navigational display and means for providing on said display indications of the position of said aircraft with respect to said course.

2. A radio avigation system including means for radiating to an aircraft signals providing a pictorial navigational display, means for radiating synchronizing signals for said display, a pair of signal radiators disposed in predetermined relation to a desired navigational course, a source of frequency-modulated signals, delay means for applying said frequency-modulated signals to said radiators so that the detectable beat frequency at points in space along said course is in predetermined harmonic relation with the frequency of said synchronizing signals; receiving means at said aircraft for providing said pictorial navigational display and means responsive to said frequency-modulated signals for providing on said display indications of the position of said aircraft with respect to said course.

3. A radio avigation system including means for radiating to an aircraft signals providing a pictorial navigational display and including predetermined frequency components, a signal radiator disposed in predetermined relation to a desired navigational course, a source of frequency-modulated signals, means for applying said frequency-modulated signals to said radiator so that the detectable beat frequency between directly radiated signals and signals reflected from a reference plane at points in space along said course is in predetermined harmonic relation with a frequency component of said display signals; receiving means at said aircraft for providing said pictorial navigational display and means responsive to said frequency-modulated signals for providing on said display indications of the position of said aircraft with respect to said course.

4. A radio avigation system including means for radiating to an aircraft signals providing a pictorial navigational display, a pair of signal radiators equally laterally displaced with respect to a desired navigational course, a source of frequency-modulated signals, differential delay means for applying said frequency-modulated signals to said radiators so that the detectable beat frequency at points in space along said course is in predetermined harmonic relation with a frequency component of said display signals; receiving means at said aircraft for providing said pictorial navigational display and means responsive to said frequency-modulated signals for providing on said display indications of the position of said aircraft with respect to said course.

5. A radio avigation system including means for radiating to an aircraft signals providing a pictorial navigational display, means for radiating synchronizing signals for said display, a pair of signal radiators equally laterally displaced with respect to a desired navigational course, another signal radiator disposed in predetermined relation to said course, a source of frequency-modulated signals, differential delay means for applying said frequency-modulated signals to said pair of radiators so that the detectable beat frequency at points in space along said course is in predetermined harmonic relation with the frequency of said synchronizing signals, means for applying said frequency-modulated signals to said other radiator so that the detectable beat frequency between directly radiated signals therefrom and signals therefrom reflected by the ground at points in space along a predetermined glide path is in predetermined harmonic relation to the frequency of said synchronizing signals, receiving means at said aircraft for providing said pictorial navigational display and means responsive to said frequency-modulated signals for providing on said display indications of the position of said aircraft with respect to said course and said glide path.

6. A radio avigation beacon transmitter system including means for radiating to an aircraft signals providing a pictorial navigational display and including predetermined frequency components, a source of frequency-modulated signals, and means for differentially radiating said frequency-modulated signals with predetermined time delay so that the detectable beat frequency at points in space along a predetermined course is in predetermined harmonic relation with a frequency component of said display signals.

7. A radio avigation beacon transmitter system including means for radiating to an aircraft signals providing a pictorial navigational display, means for radiating synchronizing signals for said display, a pair of signal radiators disposed in predetermined relation to a desired navigational course, a source of frequency-modulated signals, and differential delay means for applying said frequency-modulated signals to said radiators so that the detectable beat frequency at points in space along said course is in predetermined harmonic relation with the frequency of said synchronizing signals.

8. A radio avigation localizer beacon transmitter system including means for radiating to an aircraft signals providing a pictorial navigational display and including predetermined frequency components, a pair of signal radiators equally laterally displaced with respect to a desired navigational source, a source of frequency-modulated signals, and differential delay means for applying said frequency-modulated signals to said radiators so that the detectable beat frequency at points in space along said course is in predetermined harmonic relation with a frequency component of said display signals.

9. A radio avigation glide path beacon transmitter system including means for radiating to an aircraft signals providing a pictorial navigational display and including predetermined frequency components, a signal radiator disposed in predetermined relation to a desired navigational glide path, a source of frequency-modulated signals, and means for applying said frequency-modulated signals to said radiator so that the detectable beat frequency between directly radiated signals therefrom and signals therefrom reflected from the ground at points in space along said glide path is in predetermined harmonic relation with a frequency component of said display signals.

10. For use in a radio avigation system having signals radiated to an aircraft and providing therein a pictorial navigational display, and including a plurality of frequency-modulated signals radiated with predetermined relative time delay so that the detectable beat frequency between said frequency-modulated signals at points in space along a desired course is in predetermined harmonic relation with a frequency component of said display signals, receiving means at said aircraft for providing said pictorial navigational display and means for providing on said display indications of the position of said aircraft with respect to said course.

11. For use in a radio avigation system having means for radiating to an aircraft signals providing a pictorial navigational display and including predetermined frequency components, and means for radiating differentially delayed frequency-modulated signals so that the detectable beat frequency at points in space along a desired course is in predetermined harmonic relation with a frequency component of said display signals, receiving means at said aircraft for providing said pictorial navigational display and means responsive to said frequency-modulated signals for providing on said display indications of the position of said aircraft with respect to said course.

12. A radio receiver system including a television receiver responsive to television signals having predetermined frequency components and providing a pictorial display, frequency-modulation receiver means responsive simultaneously to a plurality of frequency-modulation signals to provide a resultant frequency signal, said resultant frequency signal having a harmonic frequency relation to a predetermined frequency component of said simultaneously received television signals, and means for combining said television signals and said resultant frequency signals.

13. Apparatus according to claim 12 including a common indicator for said television signals and said resultant frequency signals.

14. Apparatus according to claim 13 wherein said common indicator is said pictorial display.

DAVID G. C. LUCK.

REFERENCES CITED

The following references are of record in the file of this patent:

UNITED STATES PATENTS

| Number | Name | Date |
|---|---|---|
| 2,027,527 | Hammond | Jan. 14, 1936 |
| 2,062,003 | Hammond | Nov. 24, 1936 |
| 2,413,620 | Guanella | Dec. 31, 1946 |
| 2,413,694 | Dingley | Jan. 7, 1947 |

FOREIGN PATENTS

| Number | Country | Date |
|---|---|---|
| 672,104 | Germany | Feb. 22, 1939 |